(12) United States Patent
Tsukuda

(10) Patent No.: US 11,780,240 B2
(45) Date of Patent: Oct. 10, 2023

(54) INFORMATION PROCESSING DEVICE HAVING ACQUIRING SECTION ACQUIRING REMAINING TAPE LENGTH, TAPE PRINTING DEVICE, TAPE PRINTING SYSTEM, METHOD FOR CONTROLLING INFORMATION PROCESSING DEVICE, AND STORAGE MEDIUM STORING PROGRAM FOR CONTROLLING INFORMATION PROCESSING DEVICE

(71) Applicant: SEIKO EPSON CORPORATION, Tokyo (JP)

(72) Inventor: Hideyuki Tsukuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 10 days.

(21) Appl. No.: 17/707,250

(22) Filed: Mar. 29, 2022

(65) Prior Publication Data
US 2022/0314640 A1 Oct. 6, 2022

(30) Foreign Application Priority Data
Mar. 30, 2021 (JP) ................................. 2021-056674

(51) Int. Cl.
*B41J 3/407* (2006.01)
*B41J 11/00* (2006.01)
*B41J 11/64* (2006.01)
*G06F 3/12* (2006.01)

(52) U.S. Cl.
CPC ......... *B41J 3/4075* (2013.01); *B41J 11/0095* (2013.01); *B41J 11/64* (2013.01); *G06F 3/121* (2013.01); *G06F 3/1256* (2013.01)

(58) Field of Classification Search
None
See application file for complete search history.

(56) References Cited

U.S. PATENT DOCUMENTS

2018/0311977 A1* 11/2018 Kosuge .................. B41J 11/703
2019/0176481 A1* 6/2019 Kawahara .............. B41J 2/3558
2019/0287431 A1 9/2019 Kamada

FOREIGN PATENT DOCUMENTS

| CN | 110116561 A | 8/2019 |
| CN | 110281659 A | 9/2019 |
| EP | 3 904 109 A1 | 11/2021 |

(Continued)

*Primary Examiner* — Andrew H Lam
(74) *Attorney, Agent, or Firm* — Oliff PLC

(57) ABSTRACT

An information processing device is communicably connected to a tape printing device that performs printing on a tape. The information processing device includes an acquiring section that acquires a remaining tape length that is a length of an unprinted portion of the tape; an accepting section that accepts an operation of editing print data; a unit label length calculating section that calculates a unit label length that is a length per label to be created by printing, on the tape, the print data being edited; a printable sheet number calculating section that calculates, based on the remaining tape length and the unit label length, the number of printable sheets that indicates how many labels with the unit label length can be created using the tape with the remaining tape length; and a sheet number notifying section that notifies a user of the calculated number of printable sheets.

10 Claims, 14 Drawing Sheets

(56) References Cited

FOREIGN PATENT DOCUMENTS

| JP | 2015-063045 A | 4/2015 |
|----|---------------|--------|
| JP | 2017-074753 A | 4/2017 |
| JP | 2020-104327 A | 7/2020 |

\* cited by examiner

INFORMATION PROCESSING DEVICE HAVING ACQUIRING SECTION ACQUIRING REMAINING TAPE LENGTH, TAPE PRINTING DEVICE, TAPE PRINTING SYSTEM, METHOD FOR CONTROLLING INFORMATION PROCESSING DEVICE, AND STORAGE MEDIUM STORING PROGRAM FOR CONTROLLING INFORMATION PROCESSING DEVICE

The present application is based on, and claims priority from JP Application Serial Number 2021-056674, filed Mar. 30, 2021, the disclosure of which is hereby incorporated by reference herein in its entirety.

BACKGROUND

1. Technical Field

The present disclosure relates to an information processing device, a tape printing device, a tape printing system, a method for controlling an information processing device, and a storage medium storing a program for controlling an information processing device.

2. Related Art

As disclosed in JP-A-2015-063045, a printing device is known, which prints print data of an unprinted portion on a tape newly attached to an attachment unit when not all of print data is completely printed in the printing of the print data on a tape previously attached to the attachment unit.

According to the printing device disclosed in JP-A-2015-063045, for example, when a user wants to create five labels based on print data being edited, but printing is cannot be completed with a tape attached to the attachment unit, and another tape to be newly attached is not prepared, the user cannot create five labels as a result. Therefore, there is a demand to check how many labels can be created based on print data being edited.

SUMMARY

According to an aspect of the present disclosure, an information processing device is communicably connected to a tape printing device that performs printing on a tape. The information processing device includes an acquiring section that acquires a remaining tape length that is a length of an unprinted portion of the tape; an accepting section that accepts an operation of editing print data and an instruction to print the print data; a unit label length calculating section that calculates a unit label length that is a length per label to be created by printing, on the tape, the print data being edited; a printable sheet number calculating section that calculates the number of printable sheets that indicates how many labels with the unit label length can be created using the tape with the remaining tape length; a first sheet number notifying section that notifies a user of the calculated number of printable sheets during the edition of the print data; and a transmitter that transmits the print data to the tape printing device based on the instruction to print the print data.

According to another aspect of the present disclosure, a tape printing device includes a printing unit that performs printing on a tape; an acquiring section that acquires a remaining tape length that is a length of an unprinted portion of the tape; an accepting section that accepts an operation of editing print data and an instruction to print the print data; a unit label length calculating section that calculates a unit label length that is a length per label to be created by printing, on the tape, the print data being edited; a printable sheet number calculating section that calculates, based on the remaining tape length and the unit label length, the number of printable sheets that indicates how many labels with the unit label length can be created using the tape with the remaining tape length; and a first sheet number notifying section that notifies a user of the calculated number of printable sheets during the edition of the print data. The printing unit prints the print data on the tape based on the instruction to print the print data.

According to still another aspect of the present disclosure, a tape printing system includes a tape printing device that performs printing on a tape and an information processing device that is communicably connected to the tape printing device. The information processing device includes an acquiring section that acquires a remaining tape length that is a length of an unprinted portion of the tape; an accepting section that accepts an operation of editing print data and an instruction to print the print data; a unit label length calculating section that calculates a unit label length that is a length per label to be created by printing, on the tape, the print data being edited; a printable sheet number calculating section that calculates, based on the remaining tape length and the unit label length, the number of printable sheets that indicates how many labels with the unit label length can be created using the tape with the remaining tape length; a first sheet number notifying section that notifies a user of the calculated number of printable sheets during the edition of the print data; and a transmitter that transmits the print data to the tape printing device based on the instruction to print the print data.

According to still another aspect of the present disclosure, a method for controlling an information processing device that is communicably connected to a tape printing device that performs printing on a tape includes causing the information processing device to: acquire a remaining tape length that is a length of an unprinted portion of the tape; accept an operation of editing print data and an instruction to print the print data; calculate a unit label length that is a length per label to be created by printing, on the tape, the print data being edited; calculate a unit label length that is a length per label to be created by printing, on the tape, the print data being edited; calculate, based on the remaining tape length and the unit label length, the number of printable sheets that indicates how many labels with the unit label length can be created using the tape with the remaining tape length; notify a user of the calculated number of printable sheets during the edition of the print data; and transmit the print data to the tape printing device based on the instruction to print the print data.

According to still another aspect of the present disclosure, a non-transitory computer-readable storage medium stores a program for controlling an information processing device that is communicably connected to a tape printing device that performs printing on a tape. The program includes causing the information processing device to: acquire a remaining tape length that is a length of an unprinted portion of the tape; accept an operation of editing print data and an instruction to print the print data; calculate a unit label length that is a length per label to be created by printing, on the tape, the print data being edited; calculate, based on the remaining tape length and the unit label length, the number of printable sheets that indicates how many labels with the unit label length can be created using the tape with the remaining tape length; notify a user of the calculated number of printable sheets during the edition of the print data; and transmit the print data to the tape printing device based on the instruction to print the print data.

DESCRIPTION OF EXEMPLARY EMBODIMENTS

Hereinafter, an information processing device, a tape printing device, a tape printing system, a method for controlling an information processing device, and a storage medium storing a program for controlling an information processing device are described with reference to the accompanying drawings. In FIGS. 1 to 5, an XYZ Cartesian coordinate system is illustrated for convenience of explanation and does not limit the following embodiment.

Figure 1:
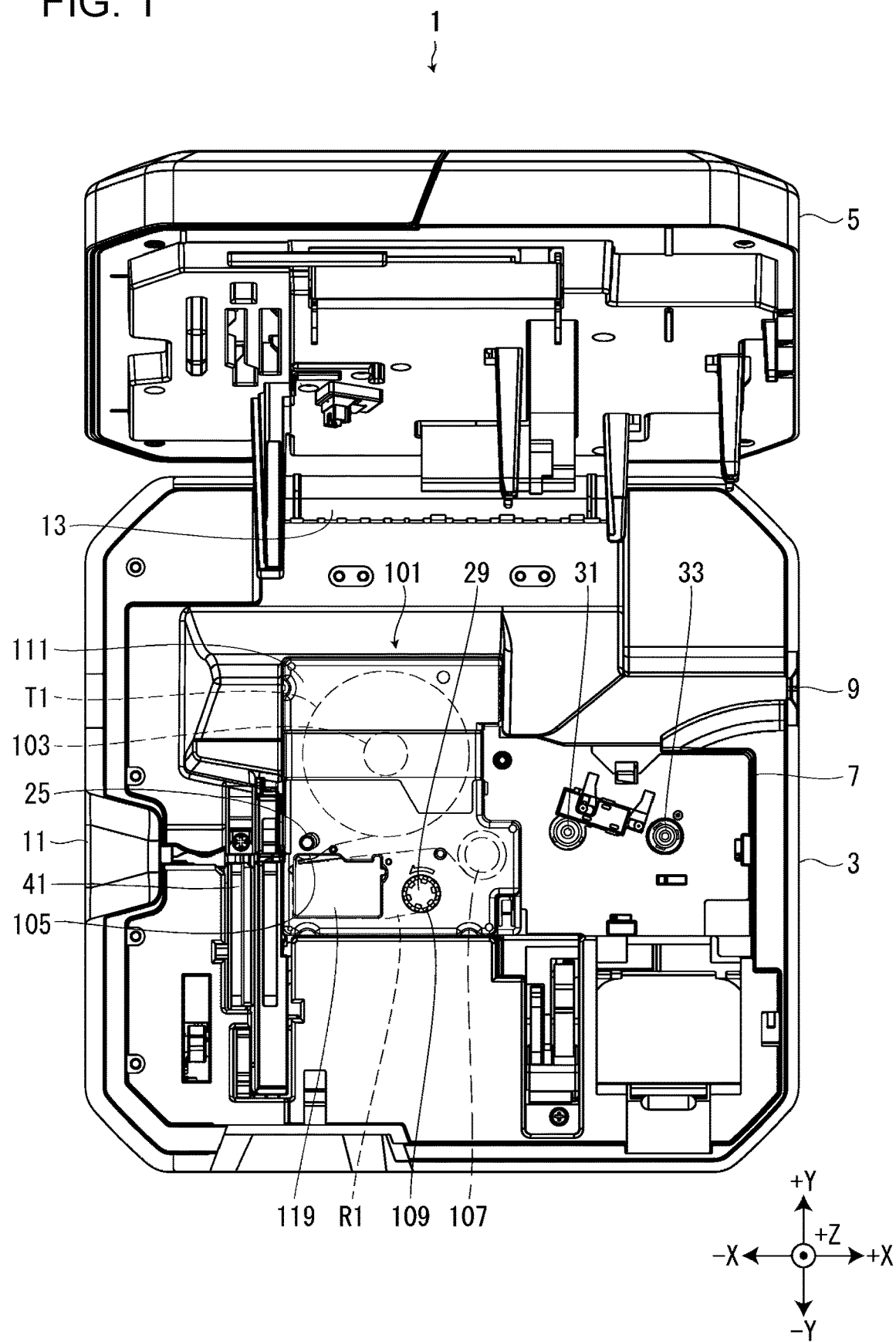
FIG. 1 is a diagram illustrating a tape printing device in a state in which a tape cartridge is attached to a cartridge attachment unit as viewed from the front side in the attachment direction.
Figure 2:
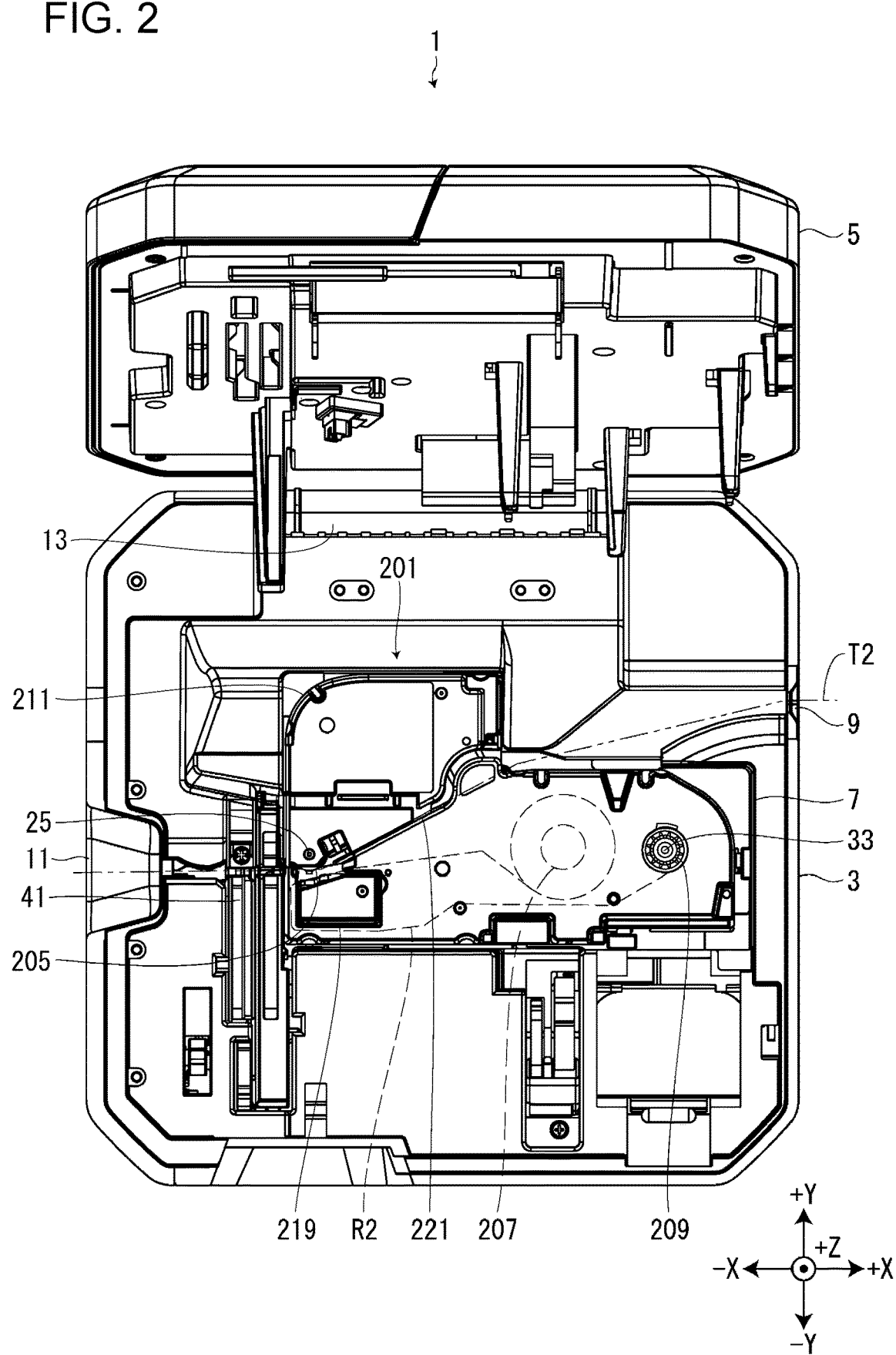
FIG. 2 is a diagram illustrating the tape printing device in a state in which a ribbon cartridge is attached to the cartridge attachment unit as viewed from the front side in the attachment direction.

First, a tape printing device 1, a tape cartridge 101, and a ribbon cartridge 201 are described with reference to FIGS. 1 to 5. As illustrated in FIGS. 1 and 2, the tape printing device 1 includes a device case 3 and an attachment unit lid 5. A cartridge attachment unit 7 is disposed in the attachment case 3 in a +Z direction. A tape cartridge 101 or a ribbon cartridge 201 is selectively attached to the cartridge attachment unit 7.

A tape insertion port 9 is disposed in a surface of the device case 3 in a +X direction. When the ribbon cartridge 201 is attached to the cartridge attachment unit 7, a second tape T2 fed from a tape roll disposed outside the tape printing device 1 is inserted from the tape insertion port 9. A tape discharge port 11 is disposed in a surface of the device case 3 in a −X direction. A first tape T1 fed from the tape cartridge 101 attached to the cartridge attachment unit 7 or the second tape T2 inserted from the tape insertion port 9 is discharged from the tape discharge port 11. A cutter 41 is disposed between the cartridge attachment unit 7 and the tape discharge port 11. The cutter 41 cuts a tape T in a width direction of the tape T to separate a printed portion of the tape T from an unprinted portion of the tape T. The attachment unit cover 5 opens and closes the cartridge attachment unit 7. The attachment unit cover 5 is attached to the device case 3 such that the attachment unit cover 5 can pivot around a hinge portion 13 disposed at an end portion of the device case 3 in a +Y direction.

Figure 4:
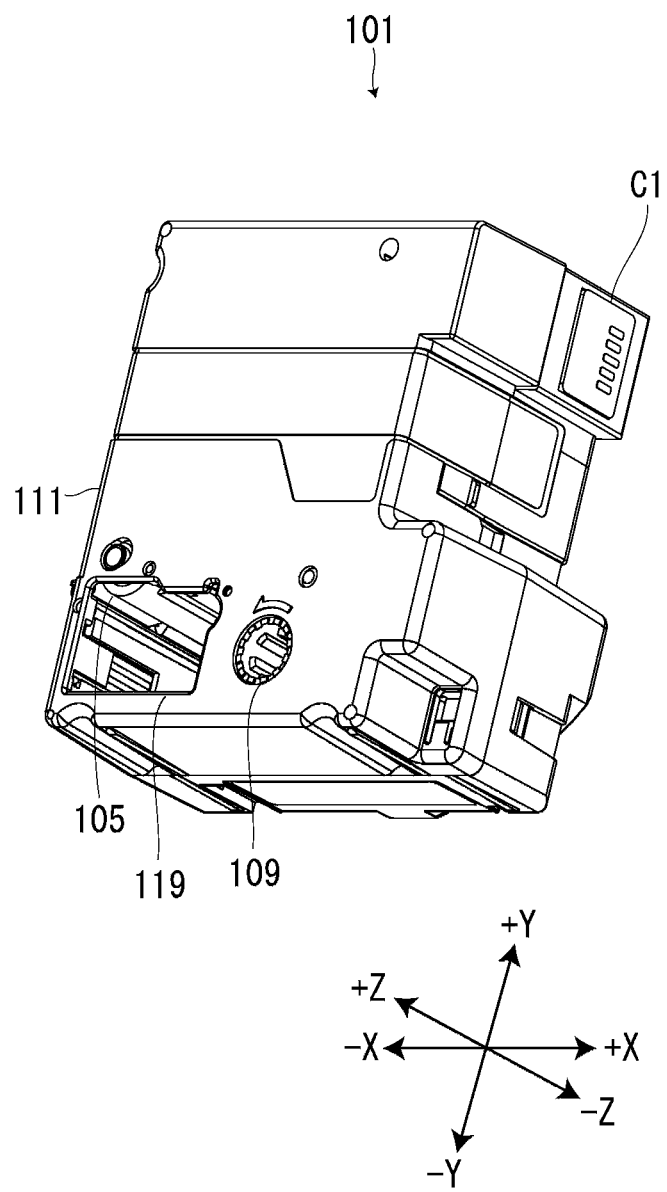
FIG. 4 is a perspective view of a tape cartridge.

As illustrated in FIGS. 1 and 4, the tape cartridge 101 includes a tape core 103, a first platen roller 105, a first paying-out core 107, a first winding core 109, and a first cartridge case 111 storing the tape core 103, the first platen roller 105, the first paying-out core 107, and the first winding core 109. The first tape T1 is wound around the tape core 103. The first tape T1 is fed from the tape core 103 through a tape output port not illustrated to the outside of the first cartridge case 111. The tape output port is disposed in a circumferential wall of the first cartridge case 111 in the −X direction. A first ink ribbon R1 is wound around the first paying-out core 107. The first ink ribbon R1 fed from the first paying-out core 107 is wound around the first winding core 109. A first head insertion hole 119 is disposed in and penetrates the first cartridge case 111 in the Z axis.

Figure 3:
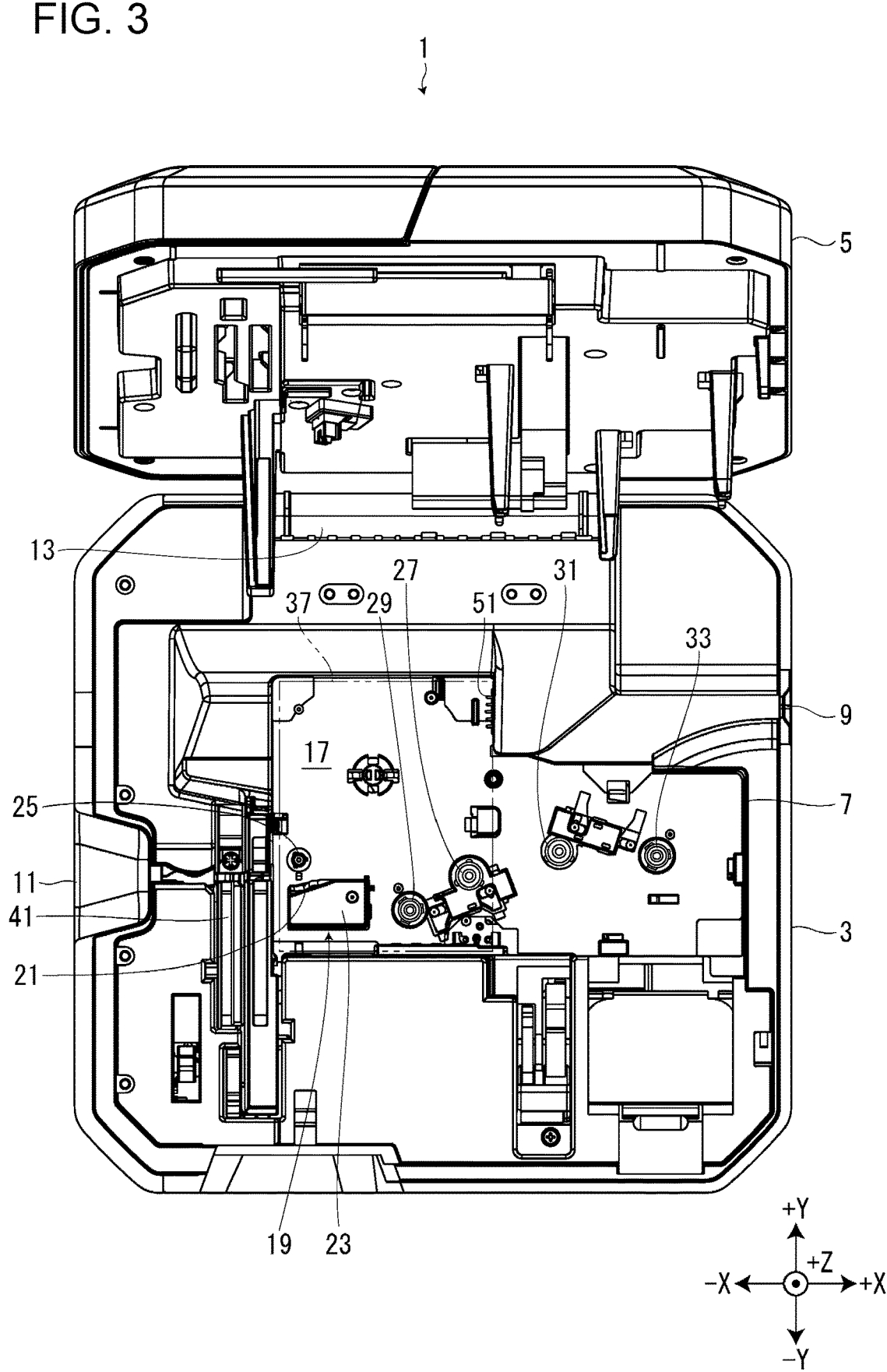
FIG. 3 is a diagram illustrating the tape printing device in a state in which any of a tape cartridge and a ribbon cartridge is not attached to the cartridge attachment unit as viewed from the front side in the attachment direction.

As illustrated in FIG. 4, a first circuit board C1 is mounted on an outer circumferential surface of the first cartridge case 111 that is present in the +X direction and the +Y direction. Cartridge information described later is stored in the first circuit board C1. In addition, as illustrated in FIG. 3, the first circuit board C1 is coupled to a circuit board coupling unit 51 disposed in the cartridge attachment unit 7.

Figure 5:
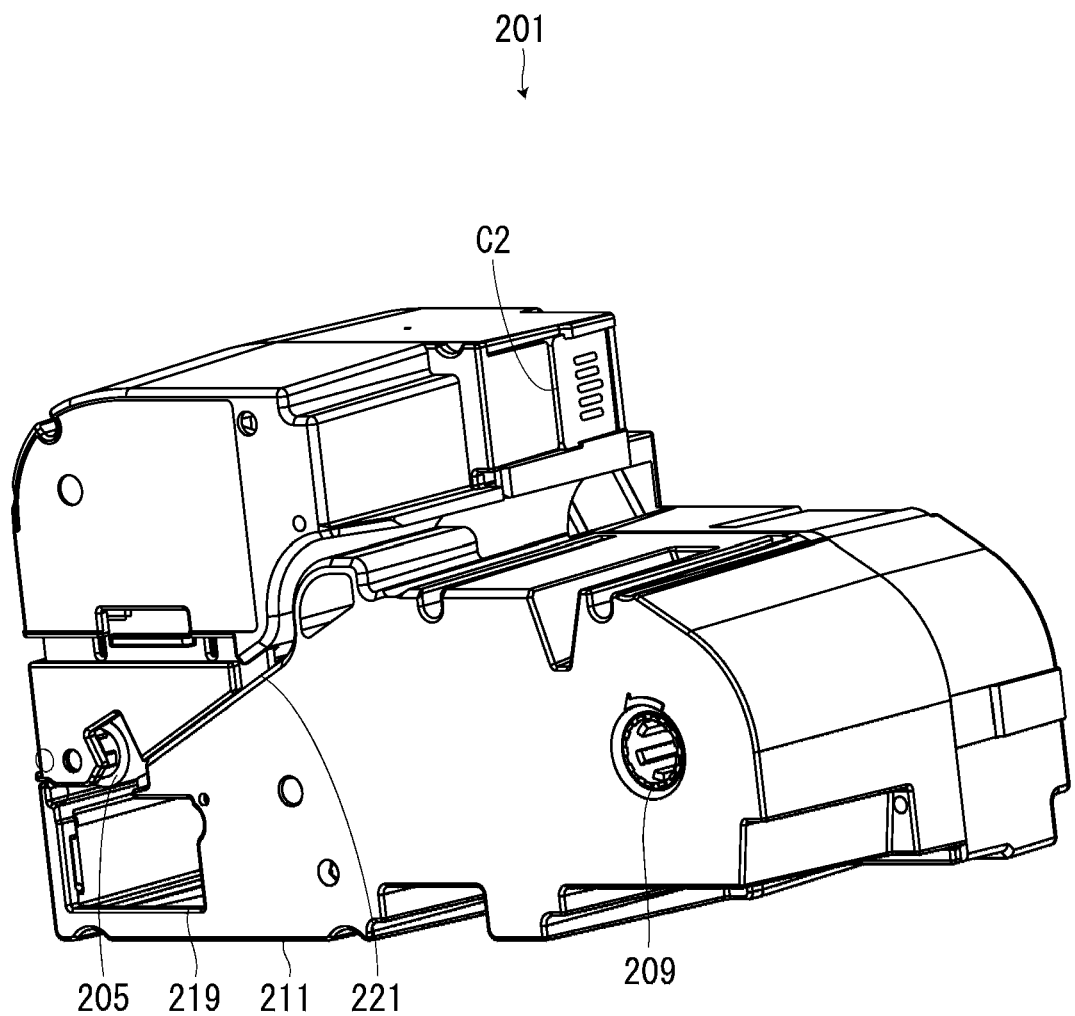
FIG. 5 is a perspective view of a ribbon cartridge.

As illustrated in FIGS. 2 and 5, the ribbon cartridge 201 includes a second platen roller 205, a second paying-out core 207, a second winding core 209, and a second cartridge case 211 storing the second platen roller 205, the second paying-out core 207, and the second winding core 209. A second ink ribbon R2 is wound around the second paying-out core 207. The second ink ribbon R2 fed from the second paying-out core 207 is wound around the second winding core 209. A second head insertion hole 219 is disposed in and penetrates the second cartridge case 211 in the Z axis. A second tape path 221 is disposed in the second cartridge case 211. The second tape T2 inserted from the tape insertion port 9 passes through the second tape path 221 and is transported to the tape discharge port 11.

As illustrated in FIG. 5, a second circuit board C2 is mounted on an outer circumferential surface of the second cartridge case 211 at a position where the second circuit board C2 is in contact with the circuit board coupling unit 51 of the cartridge attachment unit 7. Cartridge information is stored in the second circuit board C2 in a similar manner to the first circuit board C1.

Figure 13:
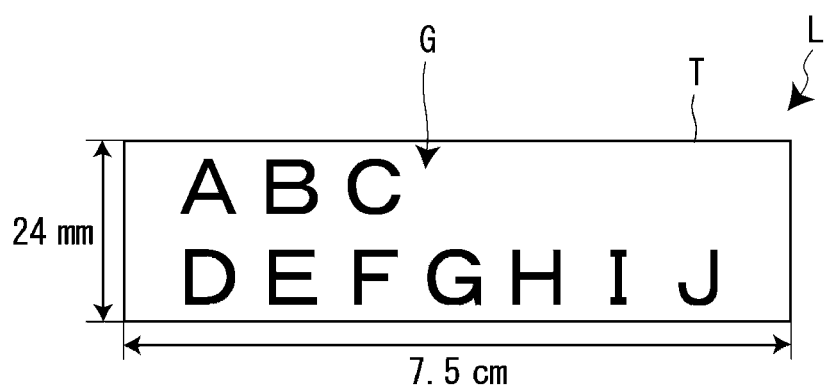
FIG. 13 is a diagram illustrating an example of a created label.

In the embodiment, the length of the second tape T2 in the tape roll in an unused state and the length of the second ink ribbon R2 stored in the ribbon cartridge 201 in an unused state are longer than the length of the first tape T1 stored in the tape cartridge 101 in an unused state and the length of the first ink ribbon R1 stored in the tape cartridge 101 in an unused state. Therefore, for example, as illustrated in FIG. 13, in the case where a large amount of a label L is created at once, the ribbon cartridge 201 is attached to the cartridge attachment unit 7.

The tape roll that feeds the second tape T2 is intended to be used in combination with the ribbon cartridge 201. The tape roll and the ribbon cartridge 201 are sold as a set. Therefore, the length of the second tape T2 in the tape roll in the unused state is substantially the same as the length of the second ink ribbon R2 stored in the ribbon cartridge 201 in the unused state.

As illustrated in FIG. 3, the cartridge attachment unit 7 is formed in a recessed shape and opened in the +Z direction. A head unit 19 is disposed on and protrudes from a bottom surface of the cartridge attachment unit 7 in the +Z direction. The bottom surface of the cartridge attachment unit 7 is an attachment bottom surface 17 facing in the −Z direction. The head unit 19 includes a thermal head 21 illustrated in FIG. 6 and a head cover 23 that covers at least a portion of the thermal head 21 that is present in the +X direction, the −Y direction, and the +Z direction. The head cover 23 protrudes in the +Z direction to the same extent as a platen shaft 25 described later. When the tape cartridge 101 is attached to the cartridge attachment unit 7, the head cover 23 is inserted in the first head insertion hole 119 and guides the attachment of the tape cartridge 101. When the ribbon cartridge 201 is attached to the cartridge attachment unit 7, the head cover 23 is inserted in the second head insertion hole 219 and guides the attachment of the ribbon cartridge 201.

The platen shaft 25, a first winding shaft 29, a first paying-out shaft 27, a second paying-out shaft 31, and a second winding shaft 33 are disposed on and protrude from the attachment bottom surface 17 in the +Z direction and are arranged in this order from the −X direction.

The platen shaft 25 is disposed in the +Y direction with respect to the thermal head 21. When the tape cartridge 101 is attached to the cartridge attachment unit 7, the platen shaft 25 is inserted in the first platen roller 105 such that the platen shaft 25 and the head cover 23 guide the attachment of the tape cartridge 101. When the ribbon cartridge 201 is attached to the cartridge attachment unit 7, the platen shaft 25 is inserted in the second platen roller 205 such that the platen shaft 25 and the head cover 23 guide the attachment of the ribbon cartridge 201.

Figure 6:
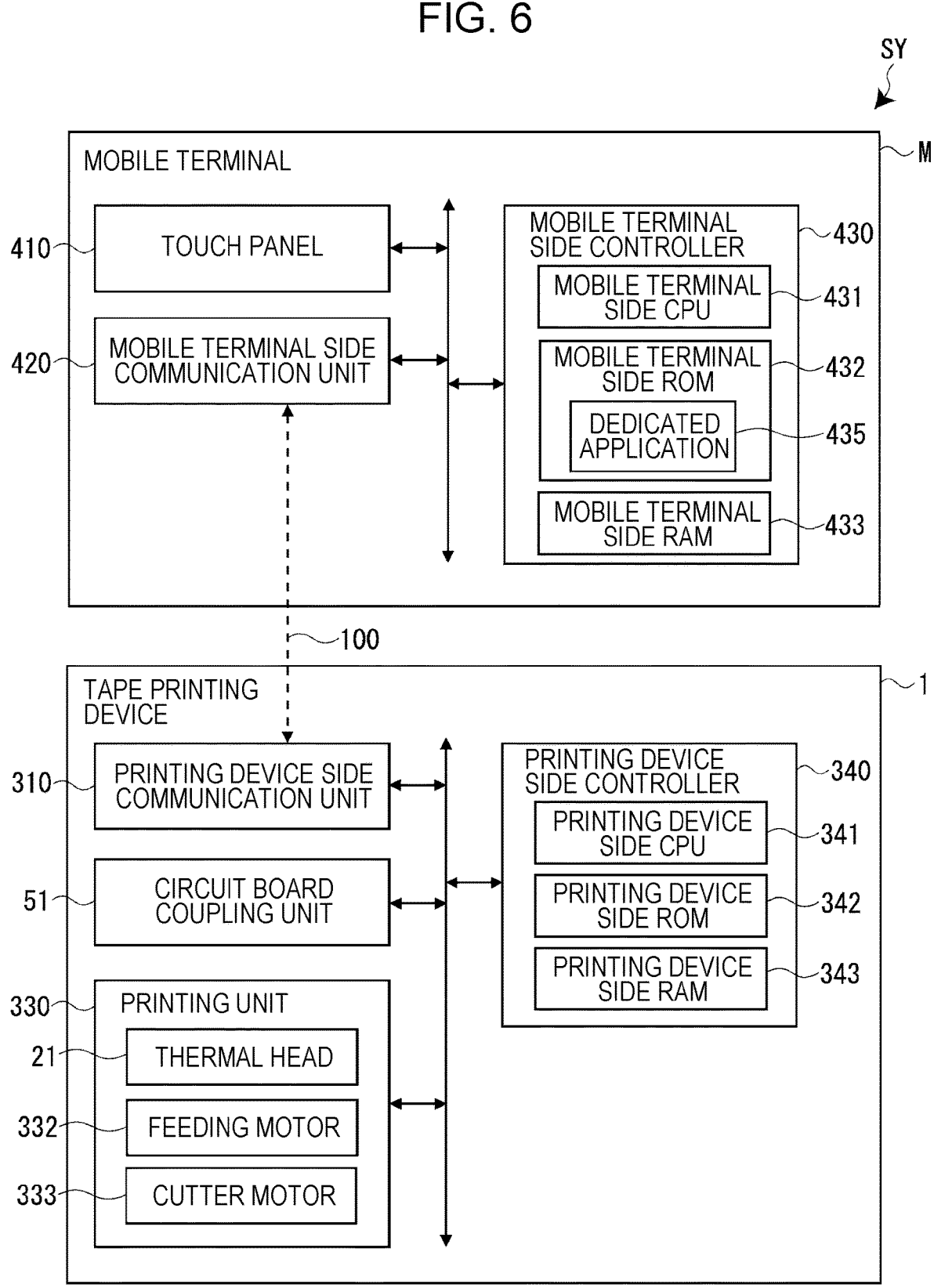
FIG. 6 is a block diagram illustrating a hardware configuration of a mobile terminal and a hardware configuration of the tape printing device.

When the tape cartridge 101 is attached to the cartridge attachment unit 7, the platen shaft 25, the first paying-out shaft 27, and the first winding shaft 29 are inserted in the first platen roller 105, the first paying-out core 107, and the first winding core 109, respectively, as illustrated in FIG. 1. In this state, when the attachment unit cover 5 is closed, the thermal head 21 is moved by a head moving mechanism not illustrated toward the platen shaft 25. This causes the first tape T1 and the first ink ribbon R1 to be held between the thermal head 21 and the first platen roller 105. The tape printing device 1 rotates the first platen roller 105 to feed the first tape T1 and the first ink ribbon R1 and causes the thermal head 21 to generate heat, thereby printing print data transmitted from a mobile terminal M described later on the first tape T1, as illustrated in FIG. 6.

In addition, when the ribbon cartridge 201 is attached to the cartridge attachment unit 7, the platen shaft 25, the second paying-out shaft 31, and the second winding shaft 33 are inserted in the second platen roller 205, the second paying-out core 207, and the second winding core 209, respectively, as illustrated in FIG. 2. In this state, when the attachment unit cover 5 is closed, the thermal head 21 is moved by the head moving mechanism toward the platen shaft 25. This causes the second tape T2 and the second ink ribbon R2 to be held between the thermal head 21 and the second platen roller 205. The tape printing device 1 rotates the second platen roller 205 to feed the second tape T2 and the second ink ribbon R2 and causes the thermal head 21 to generate heat, thereby printing the print data transmitted from the mobile terminal M on the second tape T2.

The circuit board coupling unit 51 is disposed on an inner circumferential surface of the cartridge attachment unit 7. The inner circumferential surface is present at a position in the +X direction with respect to a common region 37 in which the tape cartridge 101 and the ribbon cartridge 201 are commonly attached. When the tape cartridge 101 is attached to the cartridge attachment unit 7, the circuit board coupling unit 51 is coupled to the first circuit board C1 mounted on the tape cartridge 101, as illustrated in FIG. 4. When the ribbon cartridge 201 is attached to the cartridge attachment unit 7, the circuit board coupling unit 51 is coupled to the second circuit board C2 mounted on the ribbon cartridge 201, as illustrated in FIG. 5.

Figure 7:
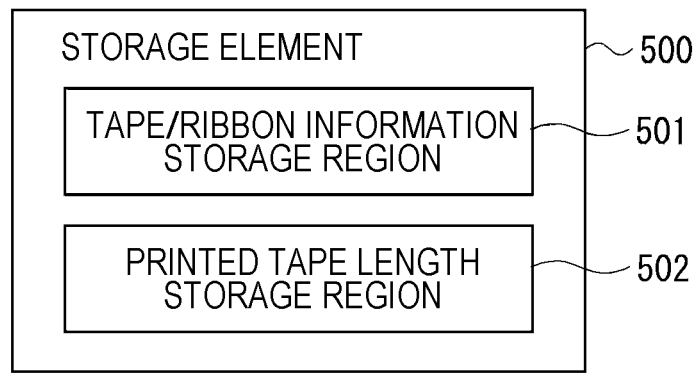
FIG. 7 is an explanatory diagram of a storage element.

The circuit board coupling unit 51 reads the cartridge information from the first circuit board C1 and the second circuit board C2. As illustrated in FIG. 7, each of the first circuit board C1 and the second circuit board C2 includes a storage element 500. The storage element 500 includes a tape/ribbon information storage region 501 for storing tape/ribbon information, and a printed tape length storage region 502 for storing a printed tape length. The printed tape length indicates the length of a printed portion of the tape T. The circuit board coupling unit 51 reads, as the cartridge information, the tape/ribbon information stored in the tape/ribbon information storage region 501 and the printed tape length stored in the printed tape length storage region 502.

The tape/ribbon information storage region 501 is a non-rewritable storage region in the tape printing device 1. On the other hand, the printed tape length storage region 502 is a rewritable storage region in the tape printing device 1.

The tape/ribbon information storage region 501 of the first circuit board C1 stores, as the tape/ribbon information, information including information indicating a cartridge type, information indicating the length of the first tape T1 stored in the tape cartridge 101 in the unused state and the length of the first ink ribbon R1 stored in the tape cartridge 101 in the unused state, information indicating the width, color, material, and the like of the first tape T1, and information indicating the width, color, and the like of the first ink ribbon R1. The "length of the first tape T1 stored in the tape cartridge 101 in the unused state" is an example of an "initial tape length". The cartridge type indicates the tape cartridge 101 or the ribbon cartridge 201.

The printed tape length storage region 502 of the first circuit board C1 stores the length of a printed portion of the first tape T1. The length of the printed portion of the first tape T1 is substantially the same as the length of a used portion of the first ink ribbon R1.

The tape/ribbon information storage region 501 of the second circuit board C2 stores, as tape/ribbon information, information including information indicating a cartridge type, information indicating the length of the second tape T2 in the tape roll in the unused state, information indicating the length of the second ink ribbon R2 stored in the ribbon cartridge 201 in the unused state, information indicating the width, color, and material of the second tape T2, and information the width, color, and the like of the second ink ribbon R2. The "length of the second tape T2 in the tape roll in the unused state" is an example of the "initial tape length".

The printed tape length storage region 502 of the second circuit board C2 stores the length of a printed portion of the second tape T2. The length of the printed portion of the second tape T2 is substantially the same as the length of a used portion of the second ink ribbon R2.

In the following description, when the first tape T1 and the second tape T2 do not need to be distinguished, each of the first tape T1 and the second tape T2 is merely referred to as "tape T". In addition, when the first ink ribbon R1 and the second ink ribbon R2 do not need to be distinguished, each of the first ink ribbon R1 and the second ink ribbon R2 is merely referred to as "ink ribbon R". Furthermore, when the first circuit board C1 and the second circuit board C2 do not need to be distinguished, each of the first circuit board C1 and the second circuit board C2 is merely referred to as "circuit board C".

Next, a control system of a tape printing system SY is described with reference to FIGS. 6 to 8. FIG. 6 is a block diagram illustrating a hardware configuration of the mobile terminal M and a hardware configuration of the tape printing device 1. The tape printing system SY includes the mobile terminal M and the tape printing device 1. The mobile terminal M is an example of an "information processing device". The mobile terminal M is communicably connected to the tape printing device 1 via wireless communication 100. The wireless communication 100 is, for example, Bluetooth (registered trademark) communication. The mobile terminal M may be connected to the tape printing device 1 via wired communication.

The mobile terminal M is, for example, a smartphone. The mobile terminal M includes a touch panel 410, a mobile terminal side communication unit 420, and a mobile terminal side controller 430 as a main hardware configuration. The mobile terminal side communication unit 420 is an example of a "receiver" and a "transmitter".

The touch panel 410 is used for various operations by a user and display of various information. For example, the touch panel 410 displays an edition screen D1 illustrated in FIG. 10 and the like and a print execution screen D2 illustrated in FIG. 12 and the like. The user uses the edition screen D1 to perform an operation of editing print data, give an instruction to print the print data, and the like.

The mobile terminal side communication unit 420 communicates with the tape printing device 1 via the wireless communication 100. For example, the mobile terminal side communication unit 420 transmits the print data to the tape printing device 1 and receives the cartridge information from the tape printing device 1.

The mobile terminal side controller 430 includes a mobile terminal side central processing unit (CPU) 431, a mobile terminal side read-only memory (ROM) 432, and a mobile terminal side random-access memory (RAM) 433.

The mobile terminal side CPU 431 loads various control programs stored in the mobile terminal side ROM 432 into the mobile terminal side RAM 433 and executes the control programs to perform various types of control. The mobile terminal side controller 430 may use, as a processor, a hardware circuit such as an application-specific integrated circuit (ASIC), instead of the mobile terminal side CPU 431. In addition, the processor may be configured such that one or more CPUs and a hardware circuit such as an ASIC operate in collaboration with each other.

The mobile terminal side ROM 432 is a rewritable ROM and stores the various control programs and various control data. For example, the mobile terminal side ROM 432 stores a dedicated application 435 for controlling the tape printing device 1. The edition screen D1 and the print execution screen D2 are displayed based on the dedicated application 435. The mobile terminal side CPU 431 uses the dedicated application 435 to generate the print data.

The mobile terminal side CPU 431 requests the tape printing device 1 to provide the cartridge information when the dedicated application 435 is activated or when the user performs a predetermined operation to request the cartridge information. The tape printing device 1 transmits the cartridge information read from the circuit board C to the mobile terminal M in accordance with the request from the mobile terminal M.

The mobile terminal side RAM 433 is used as a work area for the mobile terminal side CPU 431 to perform various types of control.

The tape printing device 1 includes a printing device side communication unit 310, the circuit board coupling unit 51, a printing unit 330, and a printing device side controller 340.

The printing device side communication unit 310 communicates with the mobile terminal M via the wireless communication 100.

The circuit board coupling unit 51 is coupled to the circuit board C.

The printing unit 330 is a mechanism for performing printing on the tape T and includes the thermal head 21, a feeding motor 332, and a cutter motor 333. The thermal head 21 includes a plurality of heating elements and performs printing by thermally transferring ink from the ink ribbon R to the tape T. The feeding motor 332 is a drive source that drives the first platen roller 105 and the first winding core 109 when the tape cartridge 101 is attached to the cartridge attachment unit 7. In addition, the feeding motor 332 is a drive source that drives the second platen roller 205 and the second winding core 209 when the ribbon cartridge 201 is attached to the cartridge attachment unit 7. The cutter motor 333 is a drive source that drives the cutter 41.

The printing device side controller 340 includes a printing device side CPU 341, a printing device side ROM 342, and a printing device side RAM 343.

The printing device side CPU 341 loads various control programs stored in the printing device side ROM 342 into the printing device side RAM 343 and executes the control programs to perform various types of control. The printing device side controller 340 may use, as a processor, a hardware circuit such as an ASIC, instead of the printing device side CPU 341. In addition, the processor may be configured such that one or more CPUs and a hardware circuit such as an ASIC operate in collaboration with each other.

The printing device side ROM 342 stores the various control programs and various control data. The printing device side RAM 343 is used as a work area for the printing device side CPU 341 to perform various types of control.

The printing device side CPU 341 uses a control program stored in the printing device side ROM 342 to perform printing on the tape T based on the print data transmitted from the mobile terminal M. Specifically, the printing device side CPU 341 controls energization to the plurality of heating elements provided in the thermal head 21 and the driving of the feeding motor 332 in coordination with each other, thereby performing the printing. In this manner, the printing device side CPU 341 controls the printing unit 330, which performs printing, by controlling the energization to the plurality of heating elements provided in the thermal head 21 and the driving of the feeding motor 332 in coordination with each other to perform the printing on the tape T and cut a printed portion of the tape T so as to create a label L (see FIG. 13).

In addition, the printing device side CPU 341 performs a tape usage amount writing process of writing a tape usage amount to the circuit board C. When the printing by the printing unit 330 is ended, the printing device side CPU 341 writes the tape usage amount indicating the length of a portion of the tape T used for the printing to the circuit board C via the circuit board coupling unit 51. The printing device side CPU 341 calculates the tape usage amount based on the number of dots by which the tape T is fed in a longitudinal direction of the tape T.

A controller of the circuit board C that is not illustrated updates the printed tape length storage region 502 based on the written tape usage amount. The controller of the circuit board C adds the tape length indicated by the written tape usage amount to the printed tape length stored in the printed tape length storage unit 502 before the update to calculate the printed tape length after the update and causes the calculated printed tape length to be stored in the printed tape length storage region 502. The printing device side CPU 341 may be configured to read the printed tape length before the update from the printed tape length storage region 502, calculate the printed tape length after the update, and write the calculated printed tape length after the update to the circuit board C. In this case, the controller of the circuit board C may cause the written printed tape length to be stored in the printed tape length storage region 502.

In addition, the printing device side CPU 341 performs the tape usage amount writing process when a tape feeding process of feeding the tape T by a predetermined length is performed. The user performs a tape feeding operation by pressing a button included in the tape printing device 1. The button is not illustrated in the drawings. When the tape feeding operation is performed and the feeding of the tape is ended, the printing device side CPU 341 writes a tape usage amount indicating the aforementioned predetermined length to the circuit board C via the circuit board coupling unit 51.

When the cartridge information is requested from the mobile terminal M, the printing device side CPU 341 reads, via the circuit board coupling unit 51, the tape/ribbon information stored in the tape/ribbon information storage region 501 and the printed tape length stored in the printed tape length storage region 502. The printing device side CPU 341 transmits, as the aforementioned cartridge information, the read tape/ribbon information and the read printed tape length to the mobile terminal M.

Figure 8:
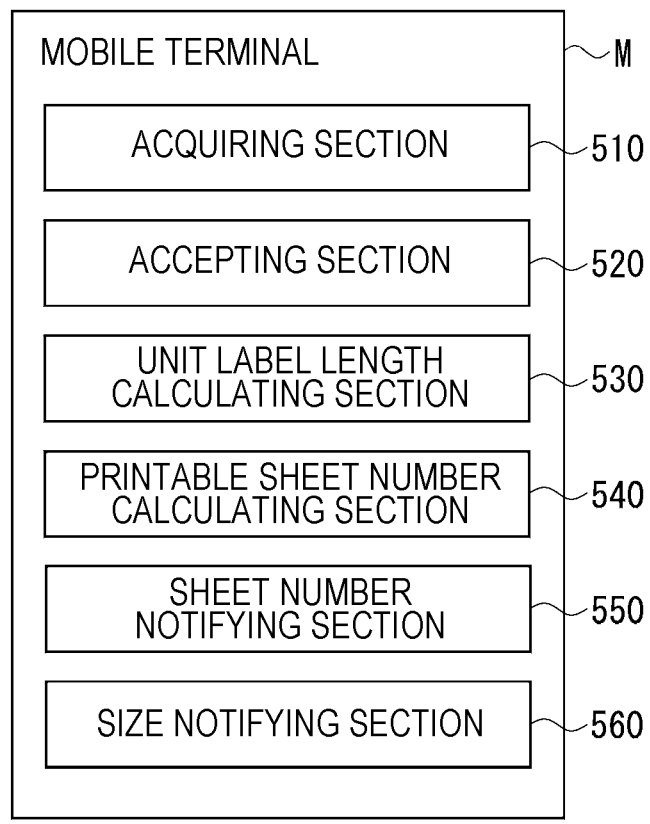
FIG. 8 is a block diagram illustrating a functional configuration of the mobile terminal.

FIG. 8 is a block diagram illustrating a functional configuration of the mobile terminal M. The mobile terminal M includes an acquiring section 510, an accepting section 520, a unit label length calculating section 530, a printable sheet number calculating section 540, a sheet number notifying section 550, and a size notifying section 560 as a functional configuration. The sheet number notifying section 550 is an example of a "first sheet number notifying section". These functions are implemented by the mobile terminal side CPU 431 executing the dedicated application 435. That is, FIG. 8 mainly illustrates the functions implemented by the mobile terminal side controller 430. The accepting section 520, the sheet number notifying section 550, and the size notifying section 560 that are among the functions illustrated in FIG. 8 are functions implemented by the mobile terminal side controller 430 and the touch panel 410.

The acquiring section 510 acquires a remaining tape length that is the length of an unprinted portion of the tape T, which is used in the tape printing device 1. The acquiring section 510 acquires the remaining tape length based on the cartridge information transmitted from the tape printing device 1. As described above, the cartridge information includes information indicating the length of the first tape T1 in the tape cartridge 101 in the unused state or the initial length indicating the length of the second tape T2 in the tape roll in the unused state, and the printed tape length. Information indicating the initial tape length and the printed tape length is hereinafter referred to as "tape length information". The acquiring section 510 acquires the remaining tape length by subtracting the printed tape length from the initial tape length based on the tape length information. For example, when the initial tape length is "800 cm" and the printed tape length is "275 cm", the remaining tape length is calculated to be "525 cm".

The acquiring section 510 may acquire the remaining tape length directly from the tape printing device 1. In this case, the tape printing device 1 transmits, to the mobile terminal M, the remaining tape length obtained by subtracting the printed tape length from the initial tape length as a part of the cartridge information.

The accepting section 520 accepts an operation of editing the print data and an instruction to print the print data. The accepting section 520 accepts the operation of editing the print data on the edition screen D1 and the instruction to print the print data on the edition screen D1 (see FIG. 10 and the like) described later.

The unit label length calculating section 530 calculates a unit label length that is a length per label L to be created by printing, on the tape T, the print data being edited on the edition screen D1. The unit label length calculating section 530 calculates the unit label length by summing a length of a print image G printed based on the print data in the tape length direction and a total length of margin regions, which are present on the front and rear sides of the print image G in the tape length direction, in the tape length direction. The total length of the margin regions in the tape length direction may be 0. Every time the accepting section 520 accepts an edition operation that changes the unit label length, the unit label length calculating section 530 calculates the unit label length.

The printable sheet number calculating section 540 calculates, based on the remaining tape length acquired by the acquiring section 510 and the unit label length calculated by the unit label length calculating section 530, the number of printable sheets that indicates how many labels L with the unit label length can be created using the tape T with the remaining tape length.

The sheet number notifying section 550 notifies the user of the number of printable sheets calculated by the printable sheet number calculating section 540 during the edition of the print data on the edition screen D1. The sheet number notifying section 550 notifies the user of the number of printable sheets by displaying first printable sheet number information 602 (see FIG. 10 and the like) on the edition screen D1.

The size notifying section 560 notifies the user of the size of a label L to be created based on the print data being edited during the edition of print data on the edition screen D1. The size notifying section 560 notifies the user of the size of the label L by displaying first label size information 601 illustrated in FIG. 10 and the like on the edition screen D1.

In addition, the size notifying section 560 notifies the user of the size of the label L to be created based on the print data during the execution of the printing of the print data in the tape printing device 1. The size notifying section 560 notifies the user of the size of the label L by displaying second label size information 611 illustrated in FIG. 12 and the like on the print execution screen D2.

Figure 9:
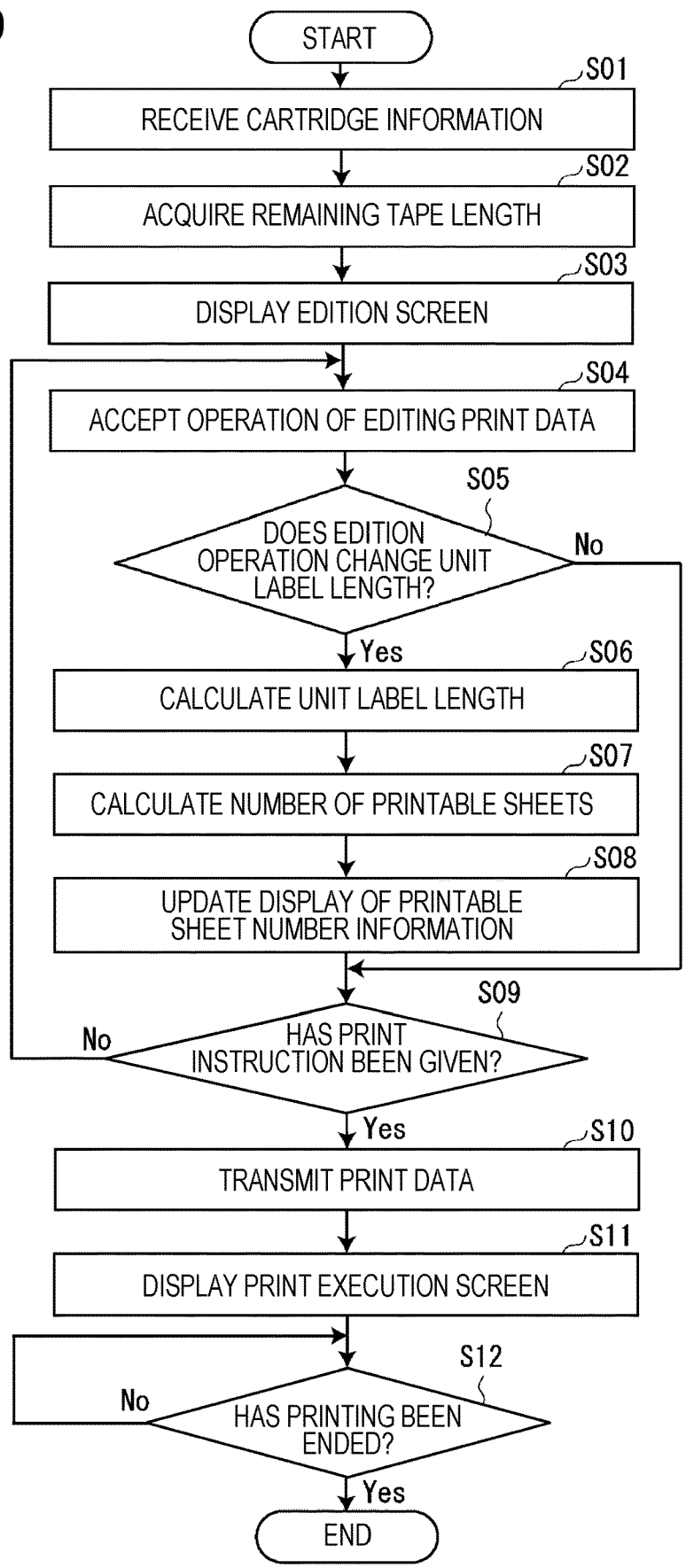
FIG. 9 is a flowchart illustrating a print instruction process by the mobile terminal.

Next, a print instruction process by the mobile terminal M is described with reference to FIG. 9. The print instruction process is started when an operation of displaying the edition screen D1 is performed by the user.

In step S01, the mobile terminal M receives the cartridge information from the tape printing device 1. The mobile terminal M transmits, to the tape printing device 1, a request signal requesting the cartridge information and receives the cartridge information from the tape printing device 1.

In step S02, the mobile terminal M acquires, based on the tape length information included in the cartridge information received in step S01, the remaining tape length that is the length of an unprinted portion of the tape T, which is used in the tape printing device 1.

In step S03, the mobile terminal M displays the edition screen D1 on the touch panel 410.

In step S04, the mobile terminal M accepts an operation of editing the print data on the edition screen D1.

In step S05, the mobile terminal M determines whether an edition operation that changes the unit label length that is the length of a label L to be created based on the print data being edited has been performed. When the mobile terminal M determines that the edition operation that changes the unit label length has been performed, the process proceeds to step S06. When the mobile terminal M determines that the edition operation that changes the unit label length has not been performed, the process proceeds to step S09.

In step S06, the mobile terminal M calculates the unit label length.

In step S07, the mobile terminal M calculates the number of printable sheets based on the remaining tape length acquired in step S02 and the unit label length calculated in step S06.

In step S08, the mobile terminal M updates the display of the first printable sheet number information 602 on the edition screen D1 based on the number of printable sheets calculated in step S07.

In step S09, the mobile terminal M determines whether a print instruction has been given. When the mobile terminal M determines that the print instruction has been given, the process proceeds to step S10. When the mobile terminal M determines that the print instruction has not been given, the process returns to step S04.

In step S10, the mobile terminal M transmits the print data to the tape printing device 1.

In step S11, the mobile terminal M displays the print execution screen D2 on the touch panel 410 during the execution of the printing of the print data in the tape printing device 1. It is assumed that the tape printing device 1 transmits a printing end signal to the mobile terminal M when the printing of the print data is ended.

In step S12, the mobile terminal M determines whether the printing has been ended in the tape printing device 1. Upon receiving the printing end signal from the tape printing device 1, the mobile terminal M determines that the printing has been ended. When the mobile terminal M determines that the printing has been ended, the mobile terminal M ends the print instruction process. When the mobile terminal M determines that the printing has been ended, the mobile terminal M hides the print execution screen D2 and displays the edition screen D1 on the touch panel 410. When the mobile terminal M determines that the printing has not been ended, the mobile terminal M repeats the determination in step S12.

Figure 10:
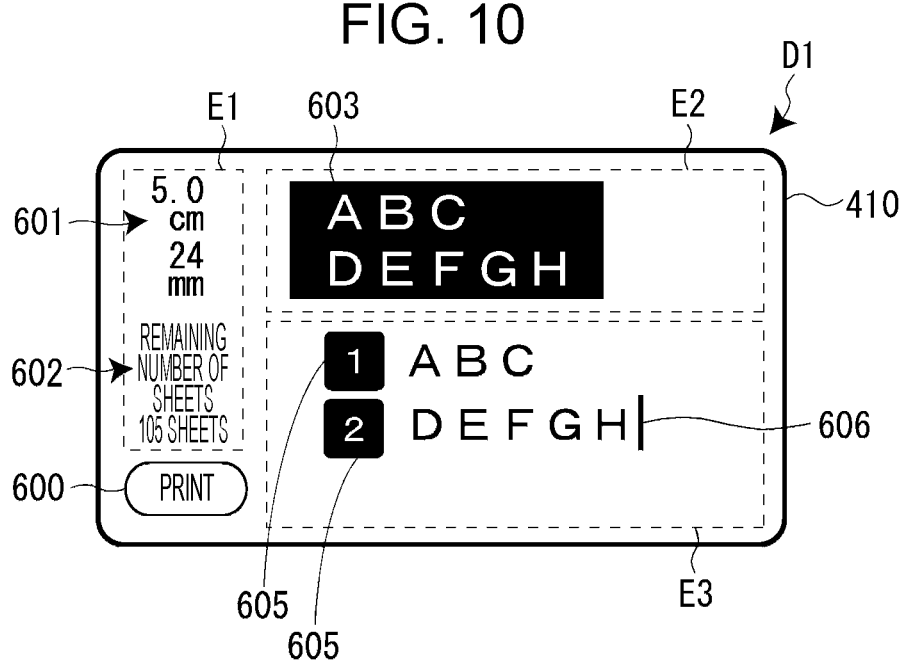
FIG. 10 is a diagram illustrating a display example of an edition screen.

Next, the various screens and the label L are described using specific examples with reference to FIGS. 10 to 13. FIG. 10 is a diagram illustrating a display example of the edition screen D1. The edition screen D1 includes a first information region E1, a label image display region E2, an edition region E3, and a print button 600. Broken lines illustrated in FIG. 10 indicate the regions and are not displayed on the edition screen D1.

In the first information region E1, the first label size information 601 and the first printable sheet number information 602 are displayed. The first label size information 601 is information including the length of a label L to be created based on the print data being edited in the edition region E3. That is, the first label size information 601 includes the unit label length and the width of the label L based on the cartridge information. In the first label size information 601, the unit label length is changed based on the edition of the print data in the edition region E3.

The first printable sheet number information 602 is information including characters of the "number of remaining sheets" and the number of printable sheets. The number of printable sheets is displayed as the "number of remaining sheets" on the edition screen D1. That is, the "number of remaining sheets" is synonymous with the "number of printable sheets". In the first printable sheet number information 602, the number of printable sheets is changed based on the edition of the print data in the edition region E3. In the example illustrated in FIG. 10, it is assumed that the remaining tape length is "525 cm", and since the unit label length is "5.0 cm", the number of printable sheets is displayed as "105 sheets".

The characters included in the first printable sheet number information 602 are not limited to the "number of remaining sheets", and it is sufficient if a character included in the first printable sheet number information 602 indicates the number of printable sheets. In addition, the first printable sheet number information 602 may include a mark indicating the number of printable sheets, instead of the characters.

In the label image display region E2, a label image 603 that is an image of a label L to be created based on the print data being edited in the edition region E3 is displayed. In the label image 603, an image of white characters is superimposed and displayed on a tape image of a black background. In the label image 603, a displayed character and the length of the tape image are changed based on the edition of the print data in the edition region E3.

The print data is edited in the edition region E3. In the case where a label L on which a print image G of characters illustrated in FIG. 13 is printed is created, one or more of the characters are edited in the edition region E3. In this case, a beginning-of-line mark 605 and a cursor 606 are displayed in addition to the characters to be edited. The beginning-of-line mark 605 is a mark with a number indicating which row is to be edited. The cursor 606 is a mark indicating an edition position. The edition region E3 illustrated in FIG. 10 is in a state in which characters "A, B, and C" are input to the first row, characters "D, E, F, G, and H" are input to the second row, and the cursor 606 is provided for the last character "H" of the second row.

The print button 600 is a button for the user to give a print instruction. When the print button 600 is selected, the mobile terminal M generates print data based on details of edition in the edition region E3 and transmits the generated print data to the tape printing device 1.

Figure 11:
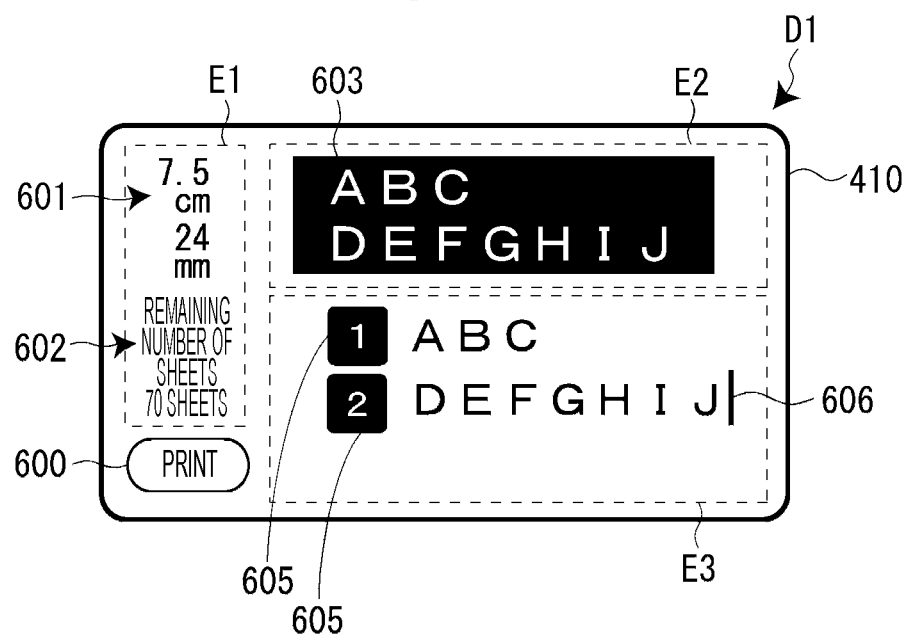
FIG. 11 is a diagram illustrating another display example of the edition screen.

FIG. 11 illustrates a state in which characters "I and J" are input and added to the second row of the edition region E3 from the state illustrated in FIG. 10. The label image 603 of the label image display region E2 is changed based on the addition of the characters. In addition, the unit label length indicated in the first label size information 601 is changed to "7.5 cm" based on the addition of the characters. Furthermore, the number of printable sheets in the first printable sheet number information 602 is changed to "70 sheets" based on the change in the unit label length.

Figure 12:
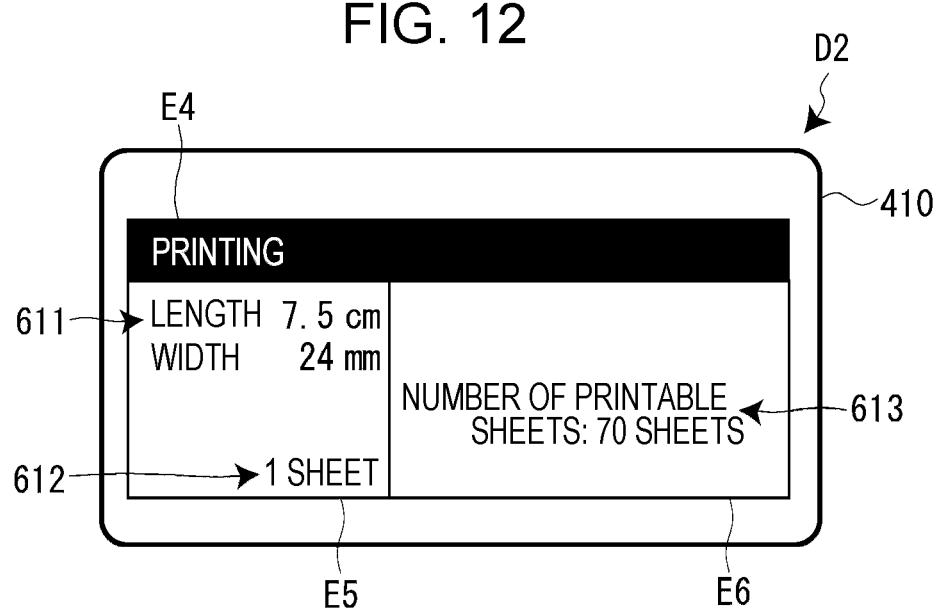
FIG. 12 is a diagram illustrating a display example of a print execution screen.

FIG. 12 is a diagram illustrating a display example of the print execution screen D2 displayed when the print button 600 is selected in the state illustrated in FIG. 11. The print execution screen D2 includes a printing notification region E4, a second information region E5, and a third information region E6.

In the printing notification region E4, a character "printing" indicating that printing is being performed in the tape printing device 1 is displayed.

In the second information region E5, the second label size information 611 and first print sheet number information 612 are displayed. The second label size information 611 includes the unit label length based on the print data on which the printing is performed in the tape printing device 1, and the width of the label L. The second label size information 611 indicates the same values as the unit label length "7.5 cm" of the first label size information 601 illustrated in FIG. 11 and the width "24 mm" of the label L. The first print sheet number information 612 indicates the number of sheets to be printed. FIG. 12 illustrates the case where the number of sheets to be printed is "1 sheet".

In the third information region E6, second printable sheet number information 613 is displayed. The second printable sheet number information 613 includes characters of the "number of printable sheets" and the number of printable sheets. The second printable sheet number information 613 indicates the same value as the number "70 sheets" that is the number of printable sheets indicated in the first printable sheet number information 602 illustrated in FIG. 11.

The characters included in the second printable sheet number information 613 are not limited to the "number of printable sheets", and it is sufficient if a character included in the second printable sheet number information 613 indicates the number of printable sheets. In addition, the second printable sheet number information 613 may include a mark indicating the number of printable sheets, instead of the characters.

In addition, the display of the print execution screen D2 according to the embodiment is not changed during the execution of the printing. For example, when the number of sheets to be printed is "2 sheets", the mobile terminal M continuously displays the same information for a period of time from the start of the printing of the first label L to the end of the printing of the second label L.

FIG. 13 is a diagram illustrating an example of the label L created after the print execution screen D2 illustrated in FIG. 12 is displayed. FIG. 13 illustrates the label L with the print image G indicating the black characters and printed on a white tape T. Since the image of the white characters is superimposed and displayed on the black tape image in the label image 603 displayed on the edition screen D1 illustrated in FIG. 11, the label L illustrated in FIG. 13 is obtained by inverting the label image 603 in black and white. In addition, the label L illustrated in FIG. 13 has the unit label length "7.5 cm" and the width "24 mm", as indicated in the first label size information 601 on the edition screen D1 illustrated in FIG. 11 and the second label size information 611 on the print execution screen D2 illustrated in FIG. 12.

As described above, the mobile terminal M according to the embodiment notifies the user of the number of printable sheets that indicates how many labels L with the unit label length based on the print data being edited can be created using the tape with the acquired remaining tape length during the edition of the print data. Therefore, the user can check how many labels L can be created based on the print data being edited before a print instruction. Therefore, when the user wants to create a larger number of labels L than the notified number of printable sheets, the user can prepare a tape cartridge 101 for replacement or a set of a ribbon cartridge 201 and a tape roll before a print instruction. In addition, when the user cannot prepare a tape cartridge 101 for replacement or the like, the user can create a desirable number of labels L by editing the print data to shorten the unit label length.

In addition, the mobile terminal M calculates the unit label length every time the mobile terminal M accepts an edition operation that changes the unit label length due to the edition of the print data. Therefore, during the edition of the print data, the user can check, in real time, how many labels L can be created based on the print data being edited.

In addition, during the edition of the print data, the mobile terminal M notifies the user of the size of a label L based on the print data being edited. Therefore, the user can check the size of a label L based on the print data being edited before a print instruction.

In addition, the mobile terminal M notifies the user of the size of a label L and the number of printable sheets during the execution of the printing of the print data in the tape printing device 1. Therefore, the user can check the size of a label L and the number of printable sheets during the execution of the printing.

Regardless of the aforementioned embodiment, the following modifications can be made.

First Modification

Figure 14:
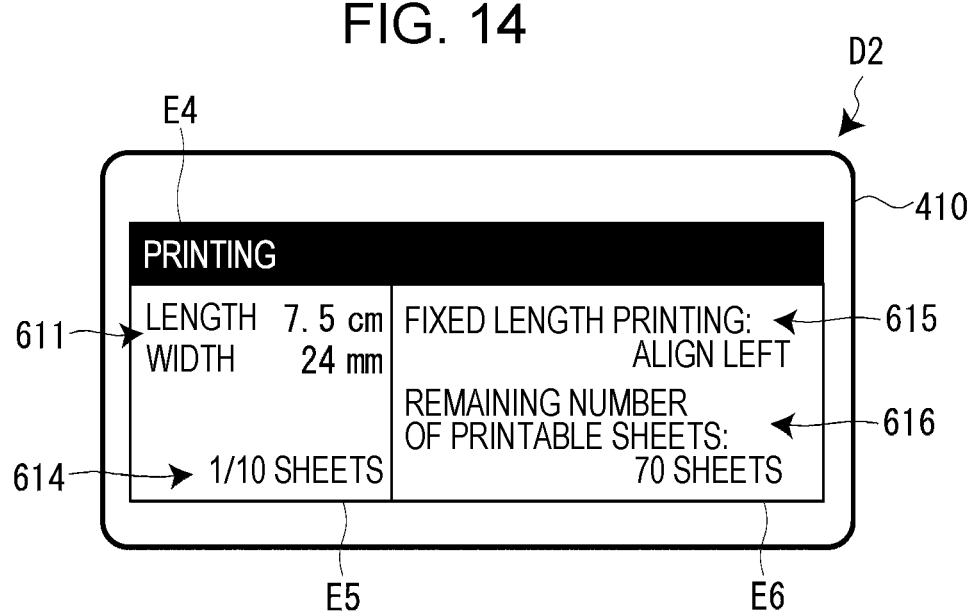
FIG. 14 is a diagram illustrating a display example of the print execution screen when repeated printing is performed.
Figure 15:
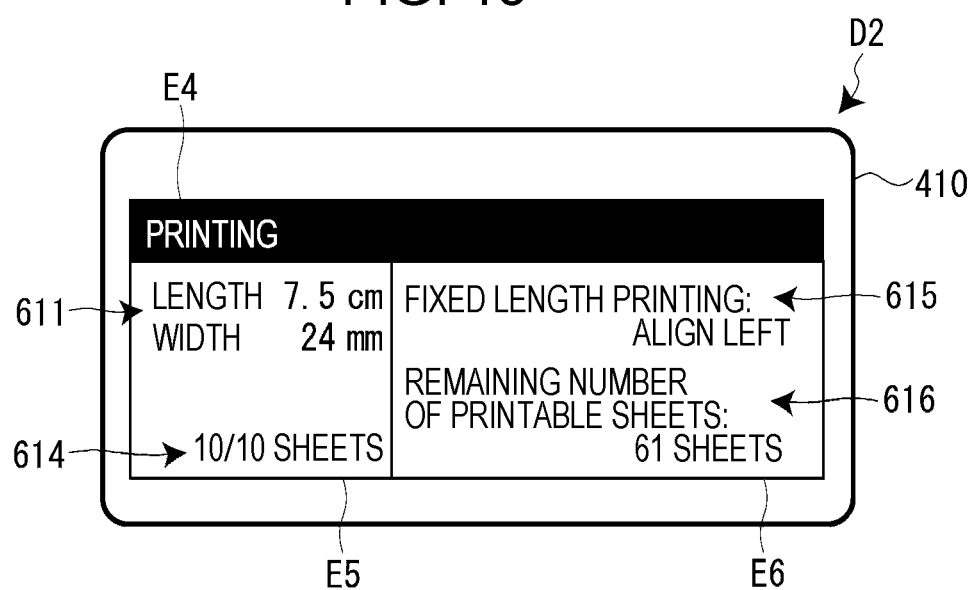
FIG. 15 is a diagram illustrating another display example of the print execution screen when the repeated printing is performed.

The mobile terminal M may display a print execution screen D2 illustrated in FIGS. 14 and 15 upon accepting a repeated printing instruction to repeatedly print at least a portion of print data. The repeated printing is, for example, continuous printing that is performed to continuously print the same print data or serial number printing that is performed while a number or a character included in print data is changed every time the printing is performed.

In the first modification, the accepting section 520 accepts the repeated printing instruction indicating the repeated printing and the number of labels L to be created by performing the repeated printing. After the accepting section 520 accepts the repeated printing instruction, the sheet number notifying section 550 notifies the user of a currently printed sheet number indicating the number of sheets printed in the repeated printing and a remaining number of printable sheets obtained by subtracting the currently printed sheet number from the number of printable sheets during the execution of the printing of the print data in the tape printing device 1. In the first modification, the sheet number notifying section 550 is an example of a "second sheet number notifying section". In the first modification, it is assumed that the tape printing device 1 transmits a printing end signal to the mobile terminal M every time the printing of one label L is ended.

FIG. 14 is a diagram illustrating a display example of the print execution screen D2 according to the first modification. Only features different from the print execution screen D2 illustrated in FIG. 12 are described below. In a second information region E5, second print sheet number information 614 is displayed, instead of the first print sheet number information 612. The second print sheet number information 614 includes the number of labels L to be created by performing the repeated printing and the currently printed sheet number indicating the number of sheets printed in the repeated printing. FIG. 14 illustrates a state in which the currently printed sheet number is "1 sheet" in the case where the number of labels L to be created by performing the repeated printing is "10 sheets". The second print sheet number information 614 may indicate only the currently printed sheet number.

In a third information region E6, setting information 615 and remaining printable sheet number information 616 are displayed, instead of the second printable sheet number information 613. The setting information 615 indicates a setting for the repeated printing. FIG. 14 illustrates the case where fixed length printing for creating a label L with a fixed length and "align left" as the arrangement of characters are set. The mobile terminal M can set any of "align left", "align center", "distributed", and "align right" as the arrangement of characters.

The remaining printable sheet number information 616 indicates a remaining number of printable sheets. The sheet number notifying section 550 according to the first modification displays, as a remaining number of printable sheets, a value obtained by adding "1" to a value obtained by subtracting the currently printed sheet number from the number of printable sheets.

FIG. 15 illustrates a state in which the repeated printing is progressed from the state illustrated in FIG. 14 and the tenth label L is printed in the tape printing device 1. The currently printed sheet number is changed to "10 sheets" in the second print sheet number information 614 due to the printing of the tenth label L in the tape printing device 1. The mobile terminal M increases the currently printed sheet number by 1 every time the mobile terminal M receives a printing end signal from the tape printing device 1.

In addition, "61 sheets" obtained by adding "1" to a value obtained by subtracting the currently printed sheet number "10 sheets" from the number "70 sheets" that is the remaining number of printable sheets in the state illustrated in FIG. 14, that is, from the number of sheets calculated before the start of the printing, is displayed as the remaining number of printable sheets in the remaining printable sheet number information 616. The mobile terminal M reduces the remaining number of printable sheets by 1 every time the mobile terminal M receives a print end signal from the tape printing device 1.

In this manner, after accepting a repeated printing instruction, the mobile terminal M according to the first modification notifies the user of the currently printed sheet number and the remaining number of printable sheets during the execution of the printing of the print data in the tape printing device 1. Therefore, the user can check the currently printed sheet number and the remaining number of printable sheets during the execution of the repeated printing in the tape printing device 1.

As another modification, the sheet number notifying section 550 may display, as the remaining number of printable sheets, a value obtained by subtracting the currently printed sheet number from the number of printable sheets, instead of a value obtained by adding "1" to a value obtained by subtracting the currently printed sheet number from the number of printable sheets.

In addition, the size notifying section 560 may not display the second label size information 611 in the case where the repeated printing is performed and lengths of labels L are different. In this case, the sheet number notifying section 550 may calculate a remaining number of printable sheets based on the lengths of the labels L and display the remaining printable sheet number information 616 indicating the calculated remaining number of printable sheets.

Second Modification

Figure 16:
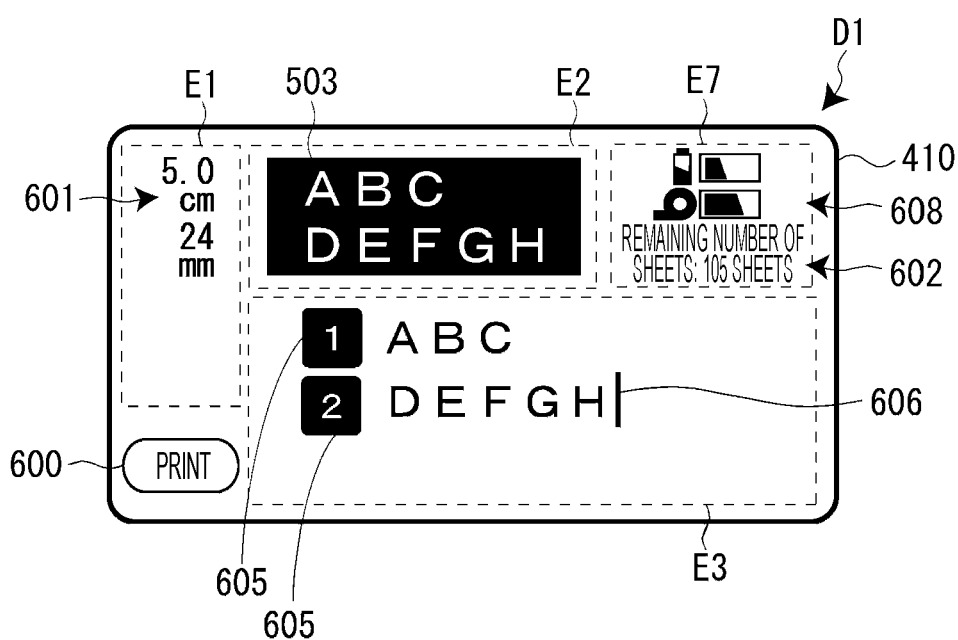
FIG. 16 is a diagram illustrating another display example of the edition screen.

The mobile terminal M may display the first printable sheet number information 602 in a region other than the first information region E1 that is a left-side region of the touch panel 410. For example, as illustrated in FIG. 16, the mobile terminal M may display the first printable sheet number information 602 in a fourth information region E7 that is an upper right region of the touch panel 410. In addition, the mobile terminal M may display icon information 608 in the fourth information region E7.

The icon information 608 includes battery icon information indicating a remaining battery level of the mobile terminal M and tape icon information indicating the remaining tape length. The battery icon information includes a battery icon representing a battery and a remaining battery level indicator. The remaining battery level indicator is displayed such that a dark region in a rectangular region decreases in size as the remaining battery level decreases. In addition, the tape icon information includes a tape icon representing the tape T and a remaining tape length indicator. The remaining tape length indicator is displayed such that a dark region in a rectangular region decreases in size as the remaining tape length is shortened.

In this manner, the mobile terminal M according to the second modification displays the icon information 608 in the vicinity of the first printable sheet number information 602. Therefore, the user can check the remaining battery level and the remaining tape length at first sight at the time of checking the number of printable sheets.

Third Modification

Figure 17:
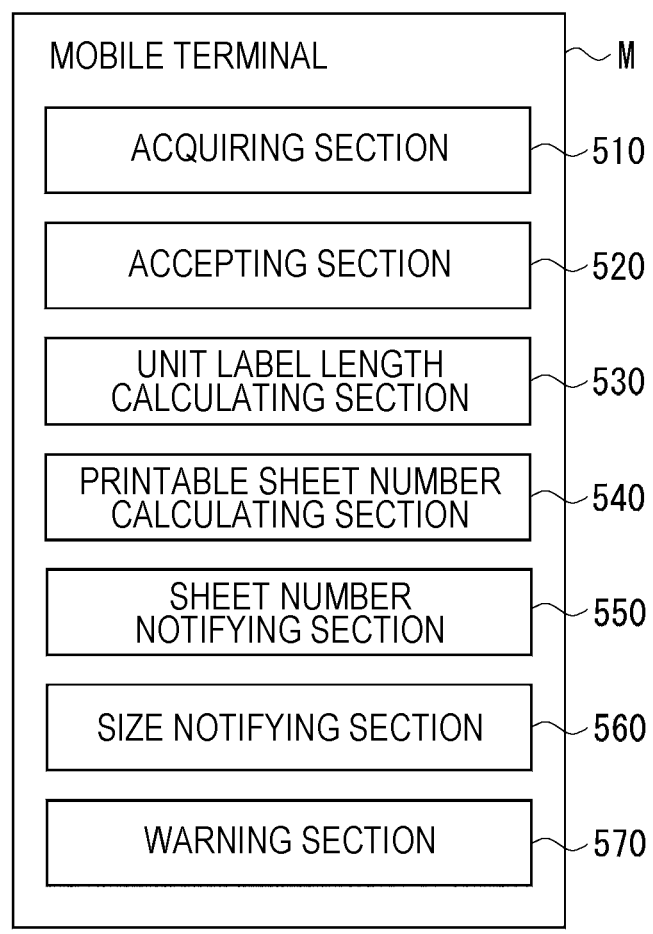
FIG. 17 is a block diagram illustrating another functional configuration of the mobile terminal.

The mobile terminal M may have a warning function. FIG. 17 is a block diagram illustrating a functional configuration of the mobile terminal M according to a third modification. The mobile terminal M according to the third modification includes a warning section 570 in addition to the functional configuration illustrated in FIG. 8. The warning section 570 is a function that is implemented mainly by the mobile terminal side CPU 431 executing the dedicated application 435. In addition, the warning section 570 is a function that is implemented by the mobile terminal side controller 430 and the touch panel 410.

Figure 18:
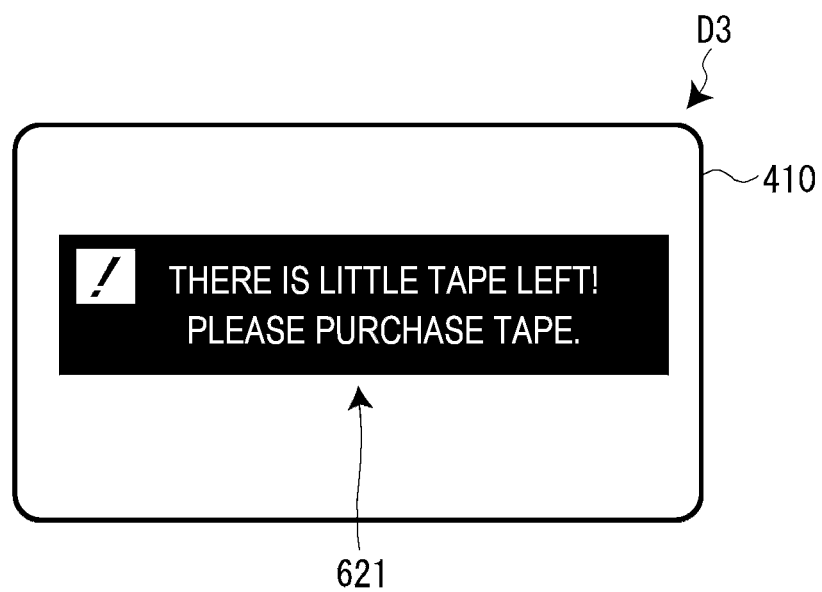
FIG. 18 is a diagram illustrating a display example of a warning screen.

When an instruction to print the print data is given in a state in which the remaining tape length is equal to or smaller than a length threshold, the warning section 570 warns the user. When the print button 600 of the edition screen D1 is selected in a state in which the remaining tape length is equal to or smaller than the length threshold, the warning section 570 displays a warning screen D3 illustrated in FIG. 18. A notification indicating that a remaining length of the tape T is small and a warning message 621 that prompts to purchase a tape T are displayed on the warning screen D3. The warning screen D3 is hidden when a certain time period elapses, or is hidden based on a user's operation. After displaying the warning screen D3, the mobile terminal M performs printing. The length threshold may be changed by a user's operation.

When the number of printable sheets calculated by the printable sheet number calculating section 540 is "0", the warning section 570 warns the user. That is, when the unit label length calculated based on the print data being edited exceeds the remaining tape length, the warning section 570 displays the warning screen D3 illustrated in FIG. 18. In this case, the warning screen D3 is hidden when a certain time period elapses, or is hidden based on a user's operation.

When an instruction to print the print data is given in a state in which the remaining tape length is equal to or smaller than the length threshold, or when the number of printable sheets calculated by the printable sheet number calculating section 540 is "0", the mobile terminal M according to the third modification warns the user. Therefore, the user can check that the remaining tape length is equal to or smaller than the length threshold and that the number of printable sheets for labels L based on the print data being edited is "0".

As another modification, a warning message displayed by the warning section 570 when an instruction to print the print data is given in a state in which the remaining tape length is equal to or smaller than the length threshold may be different from a warning message displayed by the warning section 570 when the number of printable sheets calculated by the printable sheet number calculating section 540 is "0".

In addition, the warning section 570 may warn the user by causing an audio output unit (not illustrated) included in the mobile terminal M to output an audio message, instead of displaying the warning screen D3 on the touch panel 410. In this case, the warning section 570 may be implemented by the mobile terminal side controller 430 and the audio output unit.

In addition, the warning section 570 may warn the user when an instruction to perform printing on a larger number of sheets than the number of printable sheets is given. According to this configuration, the user can confirm that the user has given an instruction to perform printing on a larger number of sheets than the number of printable sheets. In this case, it is preferable that the mobile terminal M stop the printing after warning the user. Alternatively, the mobile terminal M may display a selection screen for prompting the user to select whether to continue the printing. When the user selects to continue the printing, the mobile terminal M may perform the printing. When the user selects not to continue the printing, the mobile terminal M may stop the printing.

Fourth Modification

The sheet number notifying section 550 and the size notifying section 560 of the mobile terminal M may warn the user by causing an audio output unit included in the mobile terminal M to output an audio message, instead of displaying the number of printable sheets, the label size, the currently printed sheet number, and a remaining number of printable sheets on the touch panel 410. In this case, the sheet number notifying section 550 and the size notifying section 560 are implemented by the mobile terminal side controller 430 and the audio output unit.

Fifth Modification

The tape printing device 1 may have the functional configuration illustrated in FIG. 8 or FIG. 17. In this case, the tape printing device 1 may have a touch panel for the printing device in, for example, the attachment unit cover 5. The touch panel for the printing device is not illustrated. In addition, the tape printing device 1 may have a keyboard and a display screen, instead of the touch panel for the printing device.

In the fifth modification, the functions illustrated in FIG. 8 or FIG. 17 are implemented mainly by the printing device side CPU 341 executing a control program stored in the printing device side ROM 342. Among the functions illustrated in FIG. 8 or FIG. 17, the accepting section 520, the sheet number notifying section 550, the size notifying section 560, and the warning section 570 are implemented by the printing device side controller 340 and the touch panel for the printing device.

Sixth Modification

In the tape printing device 1, a radio frequency (RF) tag may be attached to the tape cartridge 101 or the ribbon cartridge 201, instead of the circuit board C included in the tape cartridge 101 or the ribbon cartridge 201. In this case, in the tape printing device 1, an RF communication unit not illustrated may be included in the cartridge attachment unit 7. The tape printing device 1 may read the cartridge information from the RF tag via the RF communication unit and write the amount of a tape used to the RF tag.

Seventh Modification

Instead of the mobile terminal M, a tablet terminal or a personal computer (PC) may be used as an information processing device. In addition, modifications can be made without departing from the gist of the present disclosure.

Appendices

An information processing device, a tape printing device, a tape printing system, a method for controlling an information processing device, and a program for controlling an information processing device are described below.

The mobile terminal M is communicably connected to the tape printing device 1 that performs printing on a tape T. The mobile terminal M includes the acquiring section 510 that acquires a remaining tape length that is a length of an unprinted portion of the tape T; the accepting section 520 that accepts an operation of editing print data and an instruction to print the print data; the unit label length calculating section 530 that calculates a unit label length that is a length per label L to be created by printing, on the tape T, the print data being edited; the printable sheet number calculating section 540 that calculates, based on the remaining tape length and the unit label length, the number of printable sheets that indicates how many labels L with the unit label length can be created using the tape with the remaining tape length; the sheet number notifying section 550 that notifies a user of the calculated number of printable sheets during the edition of the print data; and the mobile terminal side communication unit 420 that transmits the print data to the tape printing device 1 based on the instruction to print the print data.

The tape printing device 1 includes the printing unit 330 that performs printing on a tape T; the acquiring section 510 that acquires a remaining tape length that is a length of an unprinted portion of the tape T; the accepting section 520 that accepts an operation of editing print data and an instruction to print the print data; the unit label length calculating section 530 that calculates a unit label length that is a length per label L to be created by printing, on the tape T, the print data being edited; the printable sheet number calculating section 540 that calculates, based on the remaining tape length and the unit label length, the number of printable sheets that indicates how many labels with the unit label length can be created using the tape T with the remaining tape length; and the sheet number notifying section 550 that notifies a user of the calculated number of printable sheets during the edition of the print data. The printing unit 330 prints the print data on the tape T based on the instruction to print the print data.

The tape printing system SY includes the tape printing device 1 that performs printing on a tape T and the mobile terminal M that is communicably connected to the tape printing device 1. The mobile terminal M includes the acquiring section 510 that acquires a remaining tape length that is a length of an unprinted portion of the tape T; the accepting section 520 that accepts an operation of editing print data and an instruction to print the print data; the unit label length calculating section 530 that calculates a unit label length that is a length per label L to be created by printing, on the tape T, the print data being edited; the printable sheet number calculating section 540 that calculates, based on the remaining tape length and the unit label length, the number of printable sheets that indicates how many labels L with the unit label length can be created using the tape T with the remaining tape length; the sheet number notifying section 550 that notifies a user of the calculated number of printable sheets during the edition of the print data; and the mobile terminal side communication unit 420 that transmits the print data to the tape printing device 1 based on the instruction to print the print data.

The method for controlling the mobile terminal M that is communicably connected to the tape printing device 1 that performs printing a tape T includes causing the mobile terminal M to acquire a remaining tape length that is a length of an unprinted portion of the tape T; accept an operation of editing print data and an instruction to print the print data; calculate a unit label length that is a length per label L to be created by printing, on the tape T, the print data being edited; calculate, based on the remaining tape length and the unit label length, the number of printable sheets that indicates how many labels L with the unit label length can be created using the tape T with the remaining tape length; notify a user of the calculated number of printable sheets during the edition of the print data; and transmit the print data to the tape printing device 1 based on the instruction to print the print data.

The dedicated application 435 causes the mobile terminal M that is communicably connected to the tape printing device 1 that performs printing on a tape T to acquire a remaining tape length that is a length of an unprinted portion of the tape T; accept an operation of editing print data and an instruction to print the print data; calculate a unit label length that is a length per label L to be created by printing, on the tape T, the print data being edited; calculate, based on the remaining tape length and the unit label length, the number of printable sheets that indicates how many labels L with the unit label length can be created using the tape T with the remaining tape length; notify a user of the calculated number of printable sheets during the edition of the print data; and transmit the print data to the tape printing device 1 based on the instruction to print the print data.

During the edition of the print data, the mobile terminal M notifies a user of the number of printable sheets that indicates how many labels L with the unit label length based on the print data being edited can be created using the tape T with the remaining tape length indicated in the acquired remaining tape length information. Therefore, the user can check how many labels L can be created based on the print data being edited before the print instruction.

The aforementioned mobile terminal M further includes the mobile terminal side communication unit 420 that receives tape length information indicating an initial tape length that is a length of a tape T that has been fed from the tape core 103 of the tape cartridge 101 attached to the cartridge attachment unit 7 of the tape printing device 1 or has been fed from the tape roll disposed outside the tape printing device 1 and is in the tape cartridge 101 in the unused state or is in the tape roll in the unused state, and a printed tape length that is a length of a printed portion of the tape T. The acquiring section 510 may acquire the remaining tape length based on the initial tape length and the printed tape length that are indicated in the received tape length information.

According to this configuration, the mobile terminal M can acquire the remaining length information by receiving the tape length information from the tape printing device 1.

In the aforementioned mobile terminal M, the accepting section 520 can accept, as the instruction to print the print data, a repeated printing instruction indicating repeated printing to repeatedly print at least a portion of the print data and the number of labels L to be printed in the repeated printing. The mobile terminal M may further include the sheet number notifying section 550 that notifies the user of a currently printed sheet number indicating the number of sheets printed in the repeated printing and a remaining number of printable sheets based on a value obtained by subtracting the currently printed sheet number from the number of printable sheets during the execution of the printing of the print data in the tape printing device 1 after the acceptance of the repeated printing instruction by the accepting section 520.

According to this configuration, the user can check the currently printed sheet number and the remaining number of printable sheets during the execution of the repeated printing in the tape printing device 1.

The aforementioned mobile terminal M may further include the size notifying section 560 that notifies the user of the size of a label L to be created based on the print data during the execution of the printing of the print data in the tape printing device 1.

According to this configuration, the user can check the size of a label L during the execution of the printing of the print data in the tape printing device 1.

In the aforementioned mobile terminal M, the unit label length calculating section 530 may calculate the unit label length every time the accepting section 520 accepts an edition operation that changes the unit label length.

According to this configuration, during the edition of print data, the user can check, in real time, how many labels L can be created based on the print data being edited.

The aforementioned mobile terminal M may further include the warning section 570 that warns the user at least one of a time when an instruction to print the print data is given in a state in which the remaining tape length is equal to or smaller than the length threshold and a time when the number of printable sheets calculated by the printable sheet number calculating section 540 is "0".

According to this configuration, the user can confirm that the remaining tape length is equal to or smaller than the length threshold and that the number of printable sheets for labels L based on the print data being edited is "0".

What is claimed is:
1. An information processing device that is communicably connected to a tape printing device that performs printing a tape, comprising:

an acquiring section that acquires a remaining tape length that is a length of an unprinted portion of the tape;

an accepting section that accepts an operation of editing print data and an instruction to print the print data;

a unit label length calculating section that calculates a unit label length that is a length per label to be created by printing, on the tape, the print data being edited;

a printable sheet number calculating section that calculates, based on the remaining tape length and the unit label length, the number of printable sheets that indicates how many labels with the unit label length can be created using the tape with the remaining tape length;

a first sheet number notifying section that notifies a user of the calculated number of printable sheets during the edition of the print data; and a transmitter that transmits the print data to the tape printing device based on the instruction to print the print data.

2. The information processing device according to claim 1, wherein the tape is fed from a tape core of a tape cartridge attached to a cartridge attachment unit of the tape printing device or is fed from a tape roll disposed outside the tape printing device, the information processing device further comprises a receiver that receives tape length information indicating an initial tape length that is a length of the tape in the tape cartridge in an unused state or a length of the tape in the tape roll in an unused state and a printed tape length that is a length of a printed portion of the tape, and the acquiring section acquires the remaining tape length based on the initial tape length and the printed tape length that are indicated in the received tape length information.

3. The information processing device according to claim 1, wherein the accepting section can accept, as the instruction to print the print data, a repeated printing instruction indicating repeated printing to repeatedly print at least a portion of the print data and the number of labels to be printed in the repeated printing, and the information processing device further comprises a second sheet number notifying section that notifies the user of a currently printed sheet number indicating the number of sheets printed in the repeated printing and a remaining number of printable sheets based on a value obtained by subtracting the currently printed sheet number from the number of printable sheets during execution of the printing of the print data in the tape printing device after the acceptance of the repeated printing instruction by the accepting section.

4. The information processing device according to claim 1, further comprising a size notifying section that notifies the user of a size of the label to be created based on the print data during execution of the printing of the print data in the tape printing device.

5. The information processing device according to claim 1, wherein the unit label length calculating section calculates the unit label length every time the accepting section accepts an edition operation that changes the unit label length.

6. The information processing device according to claim 1, further comprising a warning section that warns the user at least one of a time when the instruction to print the print data is given in a state in which the remaining tape length is equal to or smaller than a length threshold and a time when the number of printable sheets calculated by the printable sheet number calculating section is "0".

7. A tape printing device comprising:

a printing unit that performs printing on a tape;

an acquiring section that acquires a remaining tape length that is a length of an unprinted portion of the tape;

an accepting section that accepts an operation of editing print data and an instruction to print the print data;

a unit label length calculating section that calculates a unit label length that is a length per label to be created by printing, on the tape, the print data being edited;

a printable sheet number calculating section that calculates, based on the remaining tape length and the unit label length, the number of printable sheets that indicates how many labels with the unit label length can be created using the tape with the remaining tape length; and a first sheet number notifying section that notifies a user of the calculated number of printable sheets during the edition of the print data, wherein the printing unit prints the print data on the tape based on the instruction to print the print data.

8. A tape printing system comprising:

a tape printing device that performs printing on a tape; and an information processing device that is communicably connected to the tape printing device, wherein the information processing device includes an acquiring section that acquires a remaining tape length that is a length of an unprinted portion of the tape, an accepting section that accepts an operation of editing print data and an instruction to print the print data, a unit label length calculating section that calculates a unit label length that is a length per label to be created by printing, on the tape, the print data being edited, a printable sheet number calculating section that calculates, based on the remaining tape length and the unit label length, the number of printable sheets that indicates how many labels with the unit label length can be created using the tape with the remaining label length, a first sheet number notifying section that notifies a user of the calculated number of printable sheets during the edition of the print data, and a transmitter that transmits the print data to the tape printing device based on the instruction to print the print data.

9. A method for controlling an information processing device that is communicably connected to a tape printing device that performs printing on a tape, the method comprising causing the information processing device to:

acquire a remaining tape length that is a length of an unprinted portion of the tape;

accept an operation of editing print data and an instruction to print the print data;

calculate a unit label length that is a length per label to be created by printing, on the tape, the print data being edited;

calculate, based on the remaining tape length and the unit label length, the number of printable sheets that indicates how many labels with the unit label length can be created using the tape with the remaining tape length;

notify a user of the calculated number of printable sheets during the edition of the print data; and transmit the print data to the tape printing device based on the instruction to print the print data.

10. A non-transitory computer-readable storage medium storing a program for controlling an information processing device that is communicably connected to a tape printing device that performs printing on a tape, the program comprising causing the information processing device to:
- acquire a remaining tape length that is a length of an unprinted portion of the tape;
- accept an operation of editing print data and an instruction to print the print data;
- calculate a unit label length that is a length per label to be created by printing, on the tape, the print data being edited;
- calculate the number of printable sheets that indicates how many labels with the unit label length can be created using the tape with the remaining tape length;
- notify a user of the calculated number of printable sheets during the edition of the print data; and
- transmit the print data to the tape printing device based on the instruction to print the print data.

* * * * *